(12) United States Patent
Johnson et al.

(10) Patent No.: US 11,688,892 B2
(45) Date of Patent: Jun. 27, 2023

(54) PHOTO-ASSISTED FAST CHARGING OF LITHIUM MANGANESE OXIDE SPINEL (LIMN2O4) IN LITHIUM-ION BATTERIES

(71) Applicant: UChicago Argonne, LLC, Chicago, IL (US)

(72) Inventors: Christopher S. Johnson, Naperville, IL (US); Anna Lee, Darien, IL (US)

(73) Assignee: UChicago Argonne, LLC, Chicago, IL (US)

( * ) Notice: Subject to any disclaimer, the term of this patent is extended or adjusted under 35 U.S.C. 154(b) by 93 days.

(21) Appl. No.: 17/148,875

(22) Filed: Jan. 14, 2021

(65) Prior Publication Data

US 2021/0167429 A1 Jun. 3, 2021

Related U.S. Application Data

(62) Division of application No. 15/651,806, filed on Jul. 17, 2017, now Pat. No. 10,910,679.

(60) Provisional application No. 62/364,071, filed on Jul. 19, 2016.

(51) Int. Cl.
| | |
|---|---|
| *H01M 10/44* | (2006.01) |
| *H01M 10/0525* | (2010.01) |
| *H01M 4/505* | (2010.01) |
| *H01M 4/525* | (2010.01) |
| *H02J 7/00* | (2006.01) |
| *H02J 7/35* | (2006.01) |
| *H01M 4/02* | (2006.01) |
| *H01M 10/052* | (2010.01) |
| *H01M 4/50* | (2010.01) |

(52) U.S. Cl.
CPC .......... *H01M 10/44* (2013.01); *H01M 4/505* (2013.01); *H01M 4/525* (2013.01); *H01M 10/0525* (2013.01); *H02J 7/00* (2013.01); *H02J 7/35* (2013.01); *H01M 4/502* (2013.01); *H01M 10/052* (2013.01); *H01M 10/441* (2013.01); *H01M 2004/028* (2013.01); *Y02E 60/10* (2013.01)

(58) Field of Classification Search
None
See application file for complete search history.

(56) References Cited

U.S. PATENT DOCUMENTS

| | | | |
|---|---|---|---|
| 5,062,689 A | 11/1991 | Koehler | |
| 5,926,202 A | 7/1999 | Hattori | |
| 7,280,230 B2 | 10/2007 | Shchegrov et al. | |
| 9,030,627 B1* | 5/2015 | Baldwin | G02F 1/133615 349/63 |
| 10,910,679 B2 | 2/2021 | Johnson et al. | |
| 2002/0106561 A1* | 8/2002 | Lee | H01M 4/602 429/231.95 |
| 2006/0236528 A1 | 10/2006 | Xu et al. | |
| 2008/0310857 A1 | 12/2008 | Fuse | |
| 2010/0248022 A1* | 9/2010 | Shirakata | H01M 10/0525 429/188 |
| 2011/0059364 A1 | 3/2011 | Zhang et al. | |
| 2011/0301018 A1 | 12/2011 | Li et al. | |
| 2011/0311880 A1* | 12/2011 | Matsui | H01M 10/054 429/304 |
| 2014/0017574 A1* | 1/2014 | Ito | H01M 4/587 429/338 |
| 2015/0280288 A1* | 10/2015 | Rajaraman | H01M 10/4257 429/185 |
| 2016/0377868 A1* | 12/2016 | Ouderkirk | G02B 6/0046 359/485.01 |
| 2017/0047559 A1 | 2/2017 | Yoo et al. | |
| 2018/0175463 A1 | 6/2018 | Sauvage et al. | |

FOREIGN PATENT DOCUMENTS

| | | |
|---|---|---|
| DE | 10 2014 112 191 A1 | 3/2015 |
| WO | WO-2015/079170 A1 | 6/2015 |
| WO | WO-2015/126074 | 8/2015 |

OTHER PUBLICATIONS

Kanamura et al., "Structural change of the LiMn2O4 spinel structure induced by extraction of lithium," Journal of Materials Chemistry 1996, 6, 33-36.
Li et al., "High-Safety and Low-Cost Photoassisted Chargeable Aqueous Sodium-Ion Batteries with 90% Input Electric Energy Savings," Adv. Energy Mater. (Jun. 22, 2016), 201600632, 6 pages.
Liu, Y. et al., "Reducing the charging voltage of a Li—O2 battery to 1.9 V by incorporating a photocatalyst," Energy Environ. Sci. 8:2664-2667 (2015).
Misra, S. K., "Interpretation of Mn2+ EPR spectra in disordered materials," Appl. Magn. Res. 1996, 10, 193-216.
Nagai, H. et al., "Photovoltaic lithium-ion battery fabricated by molecular precursor method," Functional Material Letters, 9(3):1650046 (2016).
Notice of Allowance in U.S. Appl. No. 15/651,806, dated Sep. 23, 2020.
Saponjic et al., "Charge separation and surface reconstruction: A Mn2+ doping study," J. Phys. Chem. B2006, 110, 25441-25450.
Stoyanova et al., "EPR of Mn4+ in spinels Li1+xMn2-xO4 with 0 <=x<=0.1," Journal of Physics and Chemistry of Solids 2000, 61,609-614.
Yang Y., et al., "Transparent Lithium-Ion Batteries," PNAS 108(32):13013-13018 (2011).
Zhecheva et al., "Microstructure of Li1+xMn2-xO4 spinels obtained from metal-organic precursors," Journal of Materials Chemistry 1999, 9, 1559-1567.
Lipton, J., et al., "Correlating wavelength dependence in LiMn2O4 cathode photo-accelerated fast charging with deformations in local structure," Cell Reports Physical Science 3, 101051, Sep. 21, 2022, pp. 1-14.

* cited by examiner

*Primary Examiner* — Anca Eoff
(74) *Attorney, Agent, or Firm* — Foley & Lardner LLP

(57) ABSTRACT

A process for charging a discharged electrochemical cell includes applying a voltage bias to the discharged electrochemical cell; and illuminating the cathode with a light source.

15 Claims, 15 Drawing Sheets

PHOTO-ASSISTED FAST CHARGING OF LITHIUM MANGANESE OXIDE SPINEL (LIMN2O4) IN LITHIUM-ION BATTERIES

CROSS REFERENCE TO RELATED APPLICATIONS

This application is a divisional of U.S. patent application Ser. No. 15/651,806, filed on Jul. 17, 2017, which claims the benefit of priority to U.S. Provisional Patent Application No. 62/364,071 filed Jul. 19, 2016, all of which are hereby incorporated by reference, in their entirety for any and all purposes.

GOVERNMENT RIGHTS

The United States Government has rights in this invention pursuant to Contract No. DE-AC02-06CH11357 between the U.S. Department of Energy and UChicago Argonne, LLC, representing Argonne National Laboratory.

FIELD

The present technology is generally related to rechargeable electrochemical cells, and more specifically is related to the use of white light shown onto an electrode during the recharge cycle.

BACKGROUND

Lithium-ion batteries are typically slow-charged in order to promote longer battery cycle life and obtain the full capacity (stored energy) of the battery. Depending on the chemistry, active particle physical morphologies, and low electrode loading, fast charging is feasible.

However, fast direct current (constant i) charging leads to unavoidable temperature increases internal to the battery from resistive heating (e.g. $i^2R$ heating). Inductive (wireless) charging also intrinsically heats the battery. These deleterious conditions may cause degradation in the battery. Lowering the time that takes to charge the battery would help make the overall device more efficient, usable and effective for the application.

SUMMARY

In one aspect, an electrochemical cell is provided, the cell including a cathode, an anode, a non-aqueous electrolyte, and a cathode illumination source configured to direct a light source at the cathode during a charging cycle. In some embodiments, the light source is a broadband white or various monochromatic light source. In any of the above embodiments, the light source is a light emitting diode, a xenon lamp, a laser, or optical fiber. In any of the above embodiments, the illumination source may be a window in a housing for the electrochemical cell, a fiber optic, or a light emitting diode. In some embodiments, both the illumination source and the light source are a light emitting diode. In any of the above embodiments, the illumination source may further include an infrared filter. In any of the above embodiments, the electrochemical cell may be a lithium ion battery, a sodium ion battery, a magnesium ion battery, or a sulfur battery.

In another aspect, a process is provided for charging a discharged electrochemical cell, the process including: applying a voltage bias to the discharged electrochemical cell; and illuminating the cathode with a light source; wherein: the discharged electrochemical cell includes a cathode, an anode, a non-aqueous electrolyte, and an illumination source. In such an embodiment, the light source may be a broadband white light source. In any such embodiments, the light source may be a light emitting diode, a xenon lamp, a laser, or optical fiber. In any of the above embodiments, the illumination source may alternatively, or in combination, be a window in a housing for the electrochemical cell, a fiber optic, or a light emitting diode. In any of the above embodiments, the illumination source may further include an infrared filter. In any of the above embodiments, the electrochemical cell may be a lithium ion battery, a sodium ion battery, a magnesium ion battery, or a sulfur battery.

In another aspect, a method is provided for generating $Mn^{4+}$ in an electrode of an electrochemical cell, the method comprising applying a charging current to the electrochemical cell, and simultaneously illuminating the electrode with visible light. In such embodiments, the visible light may be a broadband white light or a monochromatic light. In any such embodiments, the electrochemical cell may be a lithium ion battery, a sodium ion battery, a magnesium ion battery, or a sulfur battery. In such embodiments, the electrode may be a cathode as described herein and containing a cathode active material as described.

BRIEF DESCRIPTION OF THE DRAWINGS

FIGS. 3A and 3B are electrochemical impedance spectra of the open cell in as a Bode plot (3A) shown for dark (indicated by circle) and light (indicated by square)and a Nyquist plot (3B), both shown for dark (shown in open circle) and light (filled square) experiments. The open cell voltage was cell 3.59 V with 5 m V input AC signal amplitude between 10 kHz to 10 mHz. The open square curve in the Bode plot clearly shows lower impedance versus open circle curve. The high frequency intercept is nearly the same (Bode), indicating no change to the bulk electrolyte cell resistance with light on.

for cells post-'light-on' versus 'dark' state cells, according to one embodiment (Dark is indicated by a solid line, light is indicated in a dash line).

Figure 7A:
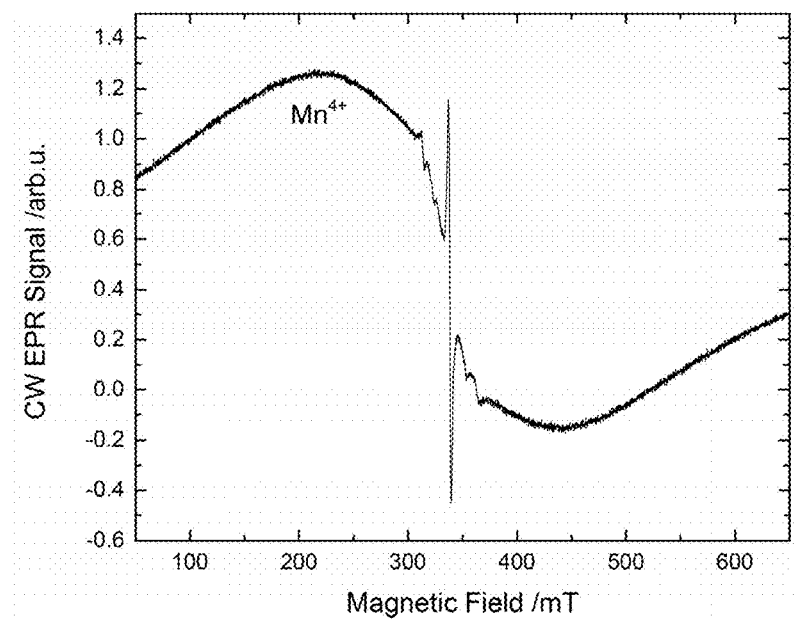
Figure 7B:
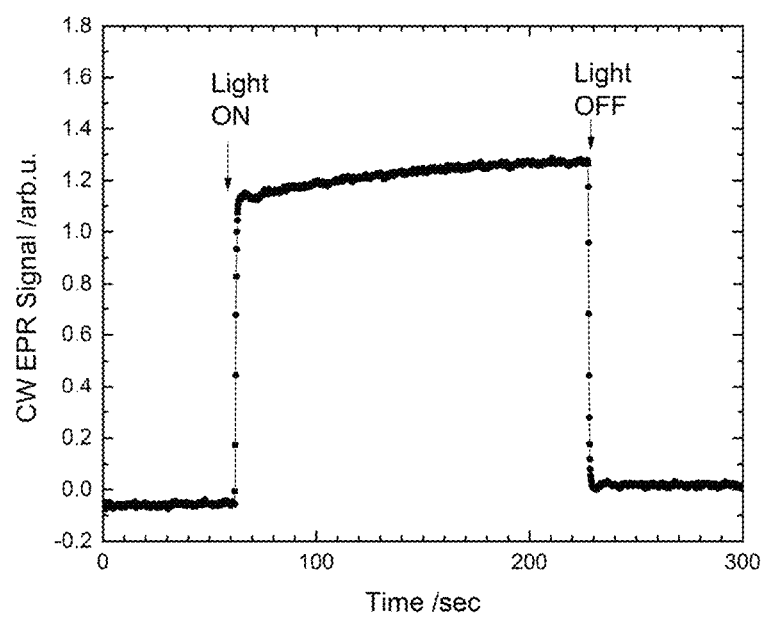

FIGS. 7A and 7B illustrate a continuous wave (CW) X-band EPR spectra of charged $LiMn_2O_4$ battery (A) before illumination and (B) during illumination (red spectrum) with white light from a Xenon lamp, T=10 K., and (C) time dependence of the EPR signal at 210 mT before, during, and after illumination. Note that the CW EPR results in a derivative-type lineshape, according to one embodiment.

Figure 8:
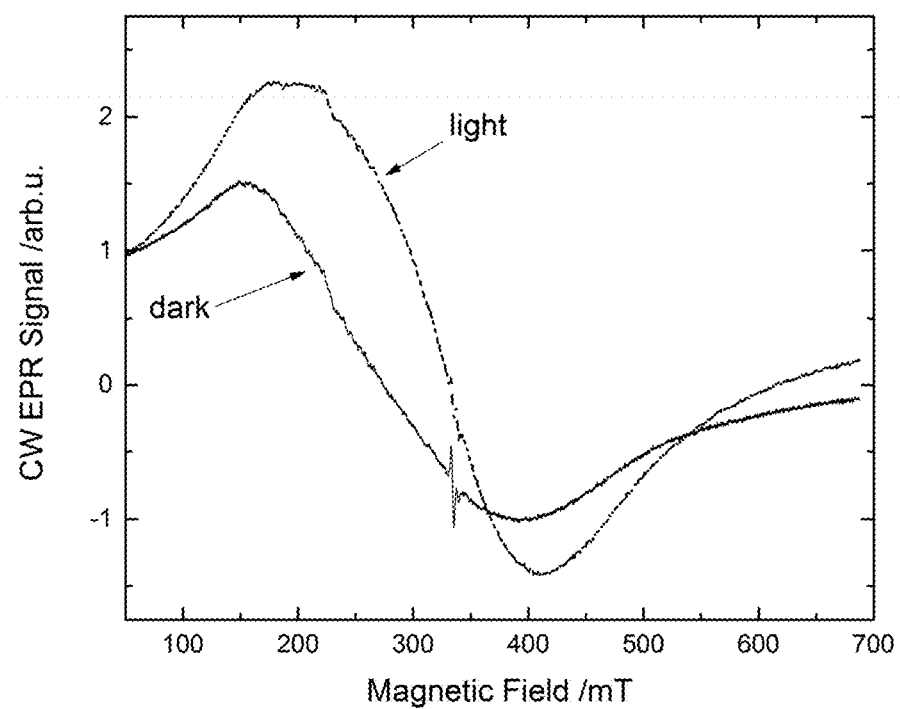

FIG. 8 illustrates continuous wave (CW) X-band EPR spectra of $LiMn_2O_4$ spinel before illumination ("dark") and during illumination ("light") with a white light at T=10 K, according to the examples.

Figure 9A:
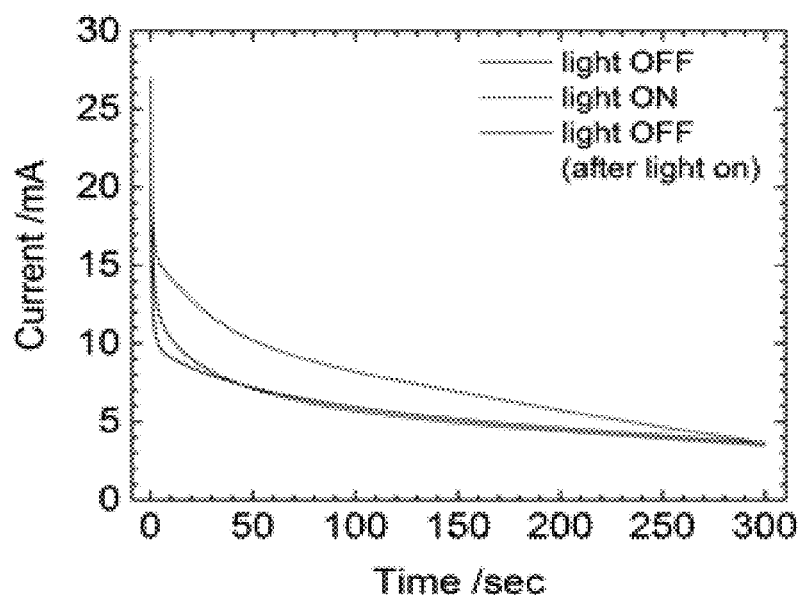
Figure 9B:
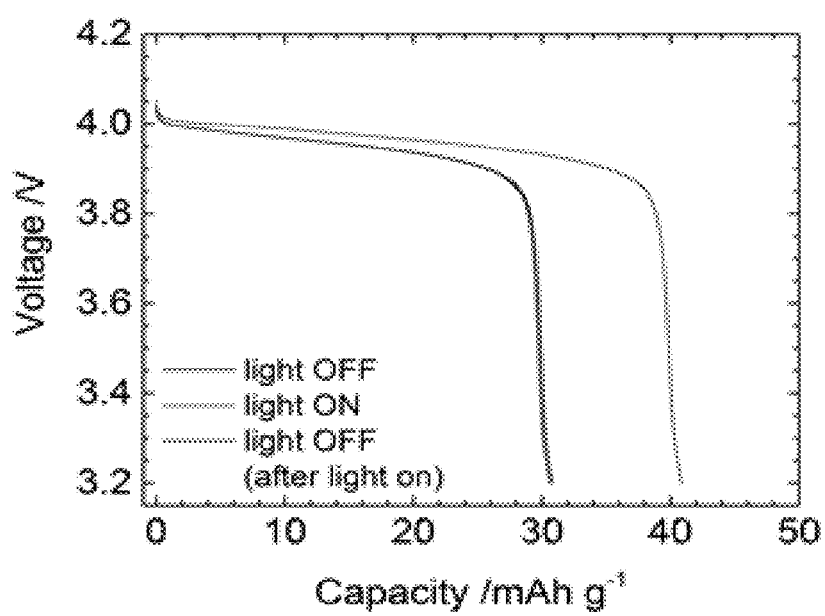

FIG. 9A illustrates the electrochemical performance of a light accepting lithium ion battery cell during charging, and FIG. 9B illustrates the same during discharge, for both light-on and light-off states, according to the examples.

Figure 10:
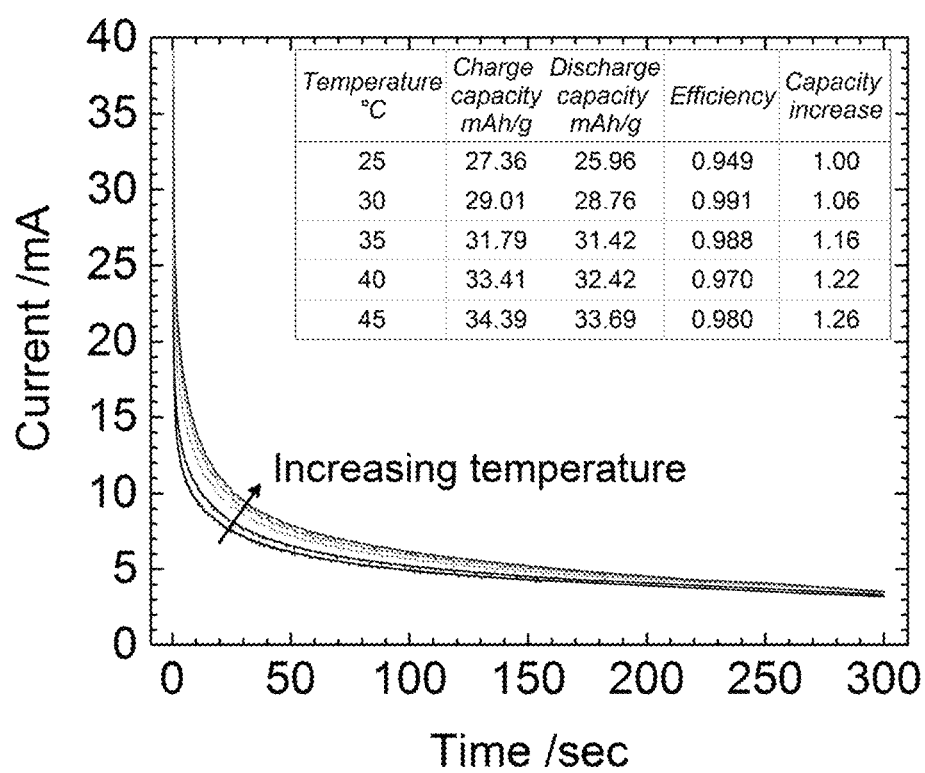

FIG. 10 illustrates the effect of temperature on the charge and discharge capacities, according to the examples.

DETAILED DESCRIPTION

Various embodiments are described hereinafter. It should be noted that the specific embodiments are not intended as an exhaustive description or as a limitation to the broader aspects discussed herein. One aspect described in conjunction with a particular embodiment is not necessarily limited to that embodiment and can be practiced with any other embodiment(s).

As used herein, "about" will be understood by persons of ordinary skill in the art and will vary to some extent depending upon the context in which it is used. If there are uses of the term which are not clear to persons of ordinary skill in the art, given the context in which it is used, "about" will mean up to plus or minus 10% of the particular term.

The use of the terms "a" and "an" and "the" and similar referents in the context of describing the elements (especially in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the embodiments and does not pose a limitation on the scope of the claims unless otherwise stated. No language in the specification should be construed as indicating any non-claimed element as essential.

Disclosed herein are lithium ion batteries and processes that allow for fast direct current charging (as well as recharging) without the severe effects produced through resistive heating. This is accomplished by irradiating the cathode electrode, during charging, with bright white light to lower activation barriers to charge transport and ionic diffusion. It has been observed that when irradiated with bright white light the electrode charges faster without, or with only minimal, deleterious side effects in the battery, or destruction of the inherent ability of the cathode to normally operate. Monitor the temperature of the cell during "light-on" show no, or only minimal, cell heating during charging.

Without being bound by theory, it is believed that irradiation of a Li-ion battery cathode electrode material surface with a broadband white light generates photo-induced energy transfer process wherein the light energy lowers charge-transfer resistance, along with other kinetic and thermodynamic barriers. The result is a battery that exhibits faster electrochemical reactions, the effect of which is faster charging in comparison to a battery that is no irradiated with white light (i.e. a "dark state battery"). The dark state battery is the common type of battery in use in today's market. However, after light activation and impingement, the subsequent discharge results in greater usable capacity and voltage, which in turn leads to higher energy density. A semi-conducting to metallic-like electronic state change is enhanced in the electrode material observed as a photocurrent, wherein electron conduction is increased within the band structure of the electrode material. This light-assisted reaction lowers transport barrier to cation diffusion through the electrode/electrolyte interface and the bulk crystal charge-carrying ion motion. Such a process can be used to fast charge cells and batteries such as lithium-ion batteries, as well as other non-aqueous batteries that feature a cathode electrolyte interphases (CEIs) and intrinsically active phases with low electronic conductivity (i.e. insulators).

As further explanation of the theory as to how the charging rate is increased under light illumination, the example of a cathode that includes manganese is described. For example, where the cathode of a lithium ion battery includes $LiMn_2O_4$ (LMO) spinel oxide, it is has been shown that exposure of the cathode to broadband white light under potential bias increases the electrode kinetics and the associated electrochemical charging rates.

Light (illumination) assists in the fast charging of LMO-based cells. Without being bound by theory, it is believed that photoexcitation primarily injects ligand holes into the oxygen 2p band and an electron is promoted to the manganese 3d conduction band. The hole formally oxidizes $O^{2-}$ to $O^-$, while the electron reduces a Mn species; in LMO this will be either $Mn^{4+}$ to $Mn^{3+}$ or $Mn^{3+}$ to $Mn^{2+}$. Under a potential bias the electron percolates through the structure via intervalence charge transfer/polaron hopping towards the current collector, where the electron passes into the external circuit and Mn is reoxidized. Since the Mn 3d valence bands are hybridized with O 2p bands, it is energetically favorable for the hole in the oxide band to be eliminated from the structure by moving to a formally Mn 3d band. In chemical terms, in a $Mn^{3+}$—$O^-$(hole)$Mn^{3/4+}$ bridge charge transfer occurs where an electron is transferred from $Mn^{3+}$ to the bridging oxygen, thereby oxidizing $Mn^{3+}$ to $Mn^{4+}$ and a $Li^+$ is ejected from the structure. Therefore, light incident on the LMO cathode during device charging initiates a lithium deinsertion process associated with anion based redox activity that acts in concert with the 3d metal cation based redox present in conventional batteries (i.e., in the 'light-off' state). In the proposed mechanism the net change in Mn oxidation state prior to electron and $Li^{30}$ removal can be summarized in equations 1(A) and (B).

In one aspect, an electrochemical cell includes a cathode, an anode, a non-aqueous electrolyte, and a cathode illumination source that is configured to direct a light source to the cathode during a charging cycle. The electrochemical cell may be a rechargeable electrochemical cell. In such cells, the light source may be a broadband white light or a monochromatic light source. For example, the light source may be, but not limited to, the sun, a light emitting diode, a xenon lamp, a laser or optical fiber light with the appropriate energy for band gap excitement. In some embodiments, the illumination source may include an infrared filter to prevent, or minimize to the extent possible, infrared heating of the cell.

$$Mn^{3+} + Mn^{4+} \rightarrow Mn^{4+} + Mn^{3+} \quad [1](A)$$

$$2Mn^{3+} \rightarrow Mn^{4+} + Mn^{2+} \quad (B)$$

In both cases electron transfer from $Mn^{3+}$ to a neighboring $Mn^{3+/4+}$ generates a $Mn^{4+}$, however in (A) the electron reduces a $Mn^{4+}+$ to $Mn^{3+}$ while in (B) a $Mn^{3+}$ is reduced to $Mn^{2+}$, i.e., disproportionation.

The illumination source may be any source that may provide light to the cathode of the electrochemical cell during charging. For example, the illumination source is used in conjunction with an optical window located in a housing for the electrochemical cell, such that an external light source may be used to direct light through the window to the cathode. The window may be a plastic, quartz, glass, $BaF_2$, or other material that will allow for the passage of the light with minimal absorption in the wavelength of interest.

The illumination source may also be a fiber optic. That is, the illumination source may be fiber optic that can deliver light to the electrochemical cell. The fiber optic may be used to direct light through a window, or directly into the cell through a port in the housing of the electrochemical cell. The fiber optic carries light from the light source, which may be external to the electrochemical cell.

The light source may be a light emitting diode (LED) source that can be located directly in the cell with the cathode material such that during a charging cycle the LED may be turned on to illuminate the cathode. In such a situation, the LED may be an external light sources that is used to illuminate the cathode during charging. However, the LED in certain embodiments may be both the illumination source and the light source, when the LED is proximally located to the cathode within the housing of the electrochemical cell, such that during charging the LED may be turned on an deliver light directly to the cathode.

As noted above, the electrochemical cell contains a non-aqueous electrolyte and is thus a non-aqueous electrochemical cell. This thus may include other non-aqueous cells, but is not limited to a lithium ion battery; thus a sodium ion battery, a magnesium ion battery, lithium air or a lithium sulfur battery are envisioned whereby these chemistries interact positively with light to allow faster recharging.

The cathode, as noted above may have a wide bandgap, be a ceramic or a semiconductor. According to some embodiments, it is believed that a the reason that illumination of the cathode is believed to work is due to the light providing the requiring energy to overcome the band gap in the cathode active material. Accordingly, in some embodiments, the cathode active materials have band gaps ranging from approximately 1.3 eV to 4 eV. Moreover, the light energy is used to assist and overcome the activation energy required for carrier mobility including enhancing conduction through polaronic mechanisms.

Illustrative cathode active materials may include, but are not limited to, a spinel, a olivine, a carbon-coated olivine, $LiFePO_4$, $LiCoO_2$, $LiNiO_2$, $LiNi_{1-x}Co_yM^4_zO_2$, $LiMn_{0.5}Ni_{0.5}O_2$, $LiMn_{1/3}Co_{1/3}Ni_{1/3}O_2$, $LiMn_2O_4$, $LiFeO_2$, $LiM^4_{0.5}Mn_{1.5}O_4$, $Li_{1+x''}Ni_\alpha Mn_\beta Co_\gamma M^5_\delta O_{2-z''}F_{z'''}$, or $VO_2$. In the cathode active materials, $M^4$ is Al, Mg, Ti, B, Ga, Si, Mn, or Co; $M^5$ is Mg, Zn, Al, Ga, B, Zr, or Ti; $0 \leq x \leq 0.3$; $0 \leq y \leq 0.5$; $0 \leq z \leq 0.5$; $0 \leq x'' \leq 0.4$; $0 \leq \alpha \leq 1$; $0 \leq \beta \leq 1$; $0 \leq \gamma \leq 1$; $0 \leq \delta \leq 0.4$; and $0 \leq z'' \leq 0.4$; with the proviso that at least one of $\alpha$, $\beta$ and $\gamma$ is greater than 0. In some embodiments, the cathode includes $LiFePO_4$, $LiCoO_2$, $LiNiO_2$, $LiNi_{1-x}Co_yM^4_zO_2$, $LiMn_{0.5}Ni_{0.5}O_2$, $LiMn_{1/3}Co_{1/3}Ni_{1/3}O_2$, $LiMn_2O_4$, $LiCr_{0.5}Mn_{1.5}O_4$, $LiCrMnO_4$, $LiFe_{0.5}Mn_{1.5}O_4$, $LiCo_{0.5}Mn_{1.5}O_4$, $LiCoMnO_4$, $LiCoMnO_4$, $LiNi_{0.5}Mn_{1.5}O_4$, $LiNiPO_4$, $LiCoPO_4$, $LiMnPO_4$, $LiCoPO_4F$, $Li_2MnO_3$, $Li_5FeO_4$, and $Li_{x'}(Met)O_2$, wherein Met is a transition metal and $1 < x' \leq 2$. In some embodiments, Met is Ni, Co, Mn, or a mixture of any two or more thereof. In some embodiments, Met is a mixture of Ni, Co, and Mn. In some embodiments, the cathode active material may include $LiFePO_4$, $LiCoO_2$, $LiNiO_2$, $LiNi_{1-x}Co_yM^4_zO_2$, $LiMn_{0.5}Ni_{0.5}O_2$, $LiMn_{1/3}Co_{1/3}Ni_{1/3}O_2$, $LiMn_2O_4$, $LiCr_{0.5}Mn_{1.5}O_4$, $LiCrMnO_4$, $LiFe_{0.5}Mn_{0.5}O_4$, $LiCo_{0.5}Mn_{1.5}O_4$, $LiCoMnO_4$, $LiCoMnO_4$, $LiNi_{0.5}Mn_{1.5}O_4$, $LiNiPO_4$, $LiCoPO_4$, $LiMnPO_4$, $LiCoPO_4F$, $Li_2MnO_3$, $Li_5FeO_4$, or $Li_{x'}(Met)O_2$, where Met is a transition metal and $1 < x' \leq 2$. Other materials may include metallic or semiconducting particles, or plasmonic particles that create nascent electric fields when irradiated by white light.

In some embodiments, the cathode may include a cathode active material that includes manganese. In such embodiments, the cathode active material may include, but is not limited to $LiMn_{0.5}Ni_{0.5}O_2$, $LiMn_{1/3}Co_{1/3}Ni_{1/3}O_2$, $LiMn_2O_4$, $LiM^4_{0.5}Mn_{1.5}O_4$, $Li_{1+x''}Ni_\alpha Mn_\beta Co_\gamma M^5_\delta O_{2-z''}F_{z'''}$, $LiMn_{0.5}Ni_{0.5}O_2$, $LiMn_{1/3}Co_{1/3}Ni_{1/3}O_2$, $LiMn_2O_4$, $LiCr_{0.5}Mn_{1.5}O_4$, $LiCrMnO_4$, $LiFe_{0.5}Mn_{1.5}O_4$, $LiCo_{0.5}Mn_{1.5}O_4$, $LiCoMnO_4$, $LiCoMnO_4$, $LiNi_{0.5}Mn_{1.5}O_4$, $LiMnPO_4$, or $Li_2MnO_3$, where $M^4$ is Al, Mg, Ti, B, Ga, Si, Mn, or Co; $M^5$ is Mg, Zn, Al, Ga, B, Zr, or Ti; $0 \leq x'' \leq 0.4$; $0 \leq \alpha \leq 1$; $0 < \beta \leq 1$; $0 \leq \gamma \leq 1$; $0 \leq \delta' \leq 0.4$; and $0 \leq 0.4$; $0 \leq z'' \leq 0.4$.

Additionally, the anode may also include metallic anode active materials such as lithium, sodium, or magnesium; sulfur materials; or carbon materials including, but not limited to, synthetic graphite, natural graphite, amorphous carbon, hard carbon, soft carbon, acetylene black, mesocarbon microbeads (MCMB), carbon black, Ketjen black, mesoporous carbon, porous carbon matrix, carbon nanotube, carbon nanofiber, or graphene. In any of the above embodiments, the anode may include a graphite material, alloys, intermetallics, silicon, silicon oxides, $TiO_2$ and $Li_4Ti_5O_{12}$, and composites thereof.

The cathodes and/or anodes of the lithium ion cells also include a current collector. Current collectors for either the anode or the cathode may include those of copper, stainless steel, titanium, tantalum, platinum, gold, aluminum, nickel, cobalt nickel alloy, highly alloyed ferritic stainless steel containing molybdenum and chromium; or nickel-, chromium-, or molybdenum-containing alloys.

The anodes and cathodes may include a binder that holds the active material and other materials in the electrode to the current collector. Illustrative binders include, but are not limited to, polyvinylidene difluoride (PVDF), polyvinyl alcohol (PVA), polyethylene, polystyrene, polyethylene oxide, polytetrafluoroethylene (Teflon), polyacrylonitrile, polyimide, styrene butadiene rubber (SBR), carboxy methyl cellulose (CMC), alginate, gelatine, a copolymer of any two or more such polymers, or a blend of any two or more such polymers.

The electrochemical cells may also include a separator between the cathode and anode to prevent shorting of the cell. Suitable separators include those such as, but not limited to, a microporous polymer film that is nylon, cellulose, nitrocellulose, polysulfone, polyacrylonitrile, polyvinylidene fluoride, polypropylene, polyethylene, polybutene, or a blend or copolymer thereof. In some embodiments, the separator is an electron beam treated micro-porous polyolefin separator. In some embodiments, the separator is a shut-down separator. Commercially available separators include those such as, but not limited to, Celgard® 2025 and 3501, Tonen separators and ceramic-coated separators.

The non-aqueous electrolyte may include a non-aqueous solvent and a salt. Illustrative non-aqueous solvents include, but are not limited to, silanes, siloxanes, ethylene carbonate, dimethylcarbonate, diethylcarbonate, propylene carbonate, dioloxane, γ-butyrolactone, δ-butyrolactone, dimethyl ether, a silane, siloxane N-methyl acetamide, acetonitrile, an acetal, a ketal, esters, a carbonates, a sulfone, a sulfite, sulfolane, an aliphatic ether, a cyclic ether, a glyme, a polyether, a phosphate ester, a siloxane, a N-alkylpyrrolidone, fluoro ether and fluoro esters, fluoroethylene carbonate, or adiponitrile, or a fluorinated solvent. Illustrative fluorinated solvents include those represented by Formula I, II, III or IV:

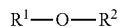

Formula I

Formula II

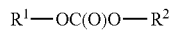

Formula III

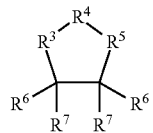

Formula IV

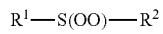

Formula V

In Formulas I, II, III, IV, and V, $R^1$ and $R^2$ are individually a an alkyl or $C_nH_xF_y$ group; $R^3$ and $R^5$ are individually O or $CR^6R^7$; $R^4$ is O or $C=O$; each $R^6$ and $R^7$ is individually H, F or a $C_nH_xF_y$ group; each x is individually from 0 to 2n; each y is individually from 1 to 2n+1; and each n is individually an integer from 1 to 20. However, the formulae are also subject to the following provisos: at least one of $R^1$ and $R^2$ is a $C_nH_xF_y$ group; at least one $R^6$ or $R^7$ is other than H, and $R^4$ is not O when $R^3$ or $R^5$ is O. In some embodiments, $R^1$ and $R^2$ are individually $CF_2CF_3$; $CF_2CHF_2$; $CF_2CH_2F$; $CF_2CH_3$; $CF_2CF_2CF_3$; $CF_2CF_2CHF_2$; $CF_2CF_2CH_2F$; $CF_2CF_2CH_3$; $CF_2CF_2CF_2CF_3$; $CF_2CF_2CF_2CHF_2$; $CF_2CF_2CF_2CH_2F$; $CF_2CF_2CF_2CH_3$; $CF_2CF_2CF_2CF_2CF_3$; $CF_2CF_2CF_2CF_2CHF_2$; $CF_2CF_2CF_2CF_2CH_2F$; $CF_2CF_2CF_2CF_2CH_3$; or $CF_2CF_2OCF_3$. In some embodiments, the fluorinated solvent includes $CHF_2CF_2OCF_2CF_2CF_2H$;

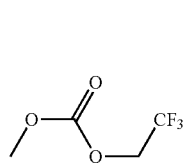 or 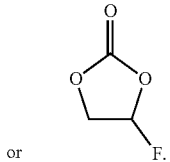

As noted, the non-aqueous electrolyte may include a non-aqueous solvent and a salt. The salt may be a salt as known for use in a lithium ion, sodium ion, magnesium ion, or other battery. For example, the salt may be a lithium salt. Suitable lithium salts include, but are not limited to, LiBr, LiI, LiSCN, $LiBF_4$, $LiAlF_4$, $LiPF_6$, $LiAsF_6$, $LiClO_4$, $Li_2SO_4$, $LiB(Ph)_4$, $LiAlO_2$, $Li[N(FSO_2)_2]$, $Li[SO_3CH_3]$, $Li[BF_3(C_2F_5)]$, $Li[PF_3(CF_2CF_3)_3]$, $Li[B(C_2O_4)_2]$, $Li[B(C_2O_4)F_2]$, $Li[PF_4(C_2O_4)]$, $Li[PF_2(C_2O_4)_2]$, $Li[CF_3CO_2]$, $Li[C_2F_5CO_2]$, $Li[N(CF_3SO_2)_2]$, $Li[C(SO_2CF_3)_3]$, $Li[N(C_2F_5SO_2)_2]$, $Li[CF_3SO_3]$, $Li_2B_{12}X_{12-n}H_n$, $Li_2B_{10}X_{10-n'}H_{n'}$, $Li_2S_{x''}R^1)_y$, $(LiSe_{x''}R^1)_y$, and lithium alkyl fluorophosphates; where X is a halogen, n is an integer from 0 to 12, n' is an integer from 0 to 10, x" is an integer from 1 to 20, y is an integer from 1 to 3, and $R^1$ is H, alkyl, alkenyl, aryl, ether, F, $CF_3$, $COCF_3$, $SO_2CF_3$, or $SO_2F$. In any of the above embodiments, the salt includes $Li[B(C_2O_4)_2]$, $Li[B(C_2O_4)F_2]$, $LiClO_4$, $LiBF_4$, $LiAsF_6$, $LiPF_6$, $LiCF_3SO_3$, $Li[N(CF_3SO_2)_2]$, $Li[C(CF_3SO_2)_3]$, $Li[N(SO_2C_2F_5)_2]$, or a lithium alkyl fluorophosphate.

In another aspect, a process is providing for charging a discharged electrochemical cell, the electrochemical cell being any of those as described above in any embodiment. The process includes applying a voltage bias to the discharged electrochemical cell; and illuminating the cathode with a light source, wherein the discharged electrochemical cell comprises a cathode, an anode, and a non-aqueous electrolyte. The illumination source may be a window in a housing for the electrochemical cell, a fiber optic, or a light emitting diode.

In the process, the illumination source may a light source. The light source may, in some embodiments be a broadband white light source. For example, the illumination source may be the sun, a light emitting diode source, a xenon source, or a laser with the appropriate energy for electron excitement of the active battery material. The illumination source may further include an infrared or to prevent, or at least minimize, heating of the electrochemical cell and/or cathode. In the process, the electrochemical cell may be a lithium ion battery, a sodium ion battery, a magnesium ion battery, or a sulfur battery. The use of the illumination source for the cathode may result in a reduction in charging time. In some embodiments, the reduction is a 10% reduction in charging time compared to a cell without the illumination source. This includes reductions of 15%, 20%, 25%, 30%, 35%, 40%, 45%, 50%, 55%, 60%, 65%, 70%, 75%, or 80%, or more. In some embodiments, the reduction in charging time is a 25% reduction in charging time compared to a cell without the illumination source. In some embodiments, the reduction in charging time is a 50% reduction in charging time compared to a cell without the illumination source. In some embodiments, the reduction in charging time is a 75% reduction in charging time compared to a cell without the illumination source. In some embodiments, the reduction in charging time is a 25-75% reduction in charging time compared to a cell without the illumination source.

Also disclosed herein are light stations that may be used in conjunction with direct current charging stations as necessary for recharge of electric vehicles or plug-in electric vehicles. For example, existing gas, rest area, or other roadway stations will be able to use existing electrical infrastructure at their locations to service the light stations to provide power to the illumination source in order to photoassist charging processes, where the batteries are those used in hybrid or electric vehicles. The light stations will look like gas pumps, but, instead will house lamps and will have their own island to easily allow servicing electric cars with the proper light harvesting technology.

The present invention, thus generally described, will be understood more readily by reference to the following examples, which are provided by way of illustration and are not intended to be limiting of the present invention.

EXAMPLES

Generally. During charge, $LiMn_2O_4$ is bulk oxidized, lithium leaves the material, and lithium cations are reduced with lithium metal deposition at the opposite anode (in this case lithium metal); the electrons travel in the external circuit with high potential ~4.0 V. Typically, a composite electrode consisting of a polytetrafluoroethylene binder, (e.g. —$(CF_2)_n$—), carbon particles as conductive diluent (e.g. acetylene carbon black), and active oxide powder in weight ratio of 20:5:75% is used and the assemblage is optimized for this process. The binder keeps particles in laminate form, the carbon, to provide conductivity network amongst the particles, and active material oxide, to support the electrochemical reaction and act as lithium cation host. For $LiMn_2O_4$, the oxidation state changes from Mn(III) to Mn(IV) within the bulk depending on the state of charge of the battery and the amount of Li in the material. During charge, high oxygen activity at the surface initiates and increases with state-of-charge. Thus, locally, the concentration of nascent $Mn^{3+}$ at the $LiMn_2O_4$ electrode surface is nominally increased compared to the bulk.

The bandgap of $LiMn_2O_4$ is about 2-3 eV, thus it exists as a poor semi-conductor, but one that may form electron-hole pairs if excitation energy is high enough to populate the conduction band with electrons. Where energy (E), $E=hf=hc/\lambda$. Here $h=6.626*10^{-34}$ Js is a universal constant called Planck's constant, and a photon with a wavelength of 450 nm possesses an energy of 2.76 eV and therefore is capable of promoting electrons into a conduction band in the material, and formation of holes ($h^+$) in the valence band creating a charge-separated state.

Window cell formation. A modified or 'open' light-accepting coin cell battery with a punched hole in the exterior was formed. Over the hole a transparent quartz window (superior transmittance in the UV and Visible spectrum regions) was sealed in place, allowing light to enter the cell through the window (see FIG. 1). The electrode is pressed onto an Al mesh screen and is built into the cell with a metallic lithium counter electrode and a glass fiber separator soaked with the lithium hexafluorophosphate salt containing aprotic ester-carbonate based solvent. The cell is crimped and thus hermetically sealed to ambient atmosphere. This cathode/Al-mesh design allows for both an even current distribution across the electrode sheet, but also can be mounted at any angle for light impingement during cell cycling (charging and discharging the energy). The spectral output of the xenon lamp broadband light spans from about 200 nm to about 1100 nm, but an IR bandpass filter is used in conjunction to minimize any heating of the cell from the light. There was a temperature increase of approximately 7° C. when electrochemical measurements were carried out under approximately one sun condition (100 mW/cm²), as measured with an IR thermometer pointed at the cell opening. Estimated energy flux ranging from 100 to 400 mW/cm² is used for experiments.

Example 1. A modified 2032 coin cell is constructed having a lithium anode, a glass fiber separator soaked in electrolyte, and a composite cathode of polytetrafluoroethylene, acetylene black carbon (TAB), and lithium manganese oxide spinel ($LiMn_2O_4$) as an active phase. The weight ratios of TAB: $LiMn_2O_4$ are 25 wt %:75 wt %. The cathode is a free-standing film rolled out, and pressed into an Al mesh grid in order to make electrical contact to the metal cell top, but also allow light to interact with the cathode. To allow the white light to impinge on the cathode, a 8 mm diameter hole is punched out of the cell bottom, and a quartz ($SiO_2$) window is affixed to the bottom and sealed to block ambient air and leave it hermetically closed.

Figure 1:
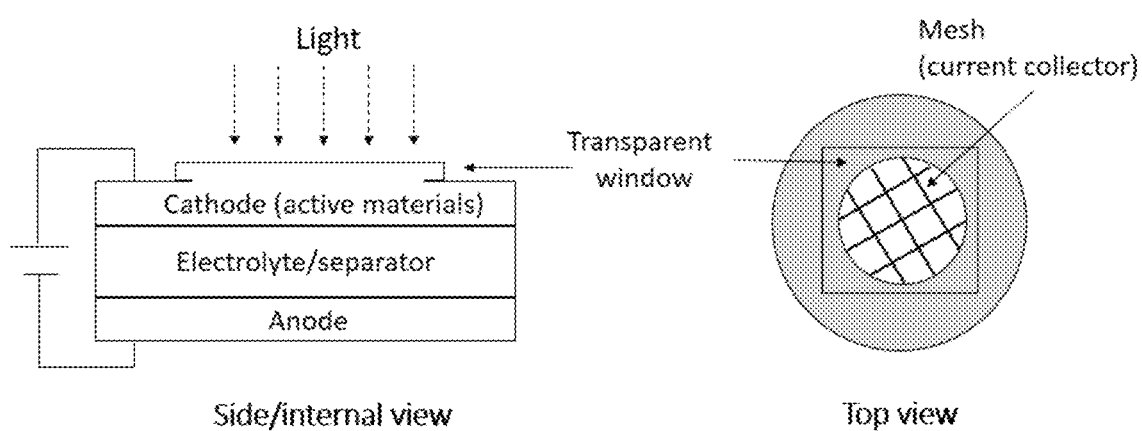
FIG. 1 is an illustration of a modified coin cell amenable to light impingement through opening at sealed quartz window, according to one embodiment.

As illustrated in FIG. 1, the cell is open whereby white light can be shone onto the cathode material during charging. The spectral output of the white light is from about 200 nm to about 1100 nm, and an infrared bandpass filter is used in conjunction with the window to block heating of the cell from infrared light. The estimated energy flux for the experiments can be varied from 100 to 400 mW/cm² at the sample. The input power of the light may be adjusted based on the desired flux.

Figure 2A:
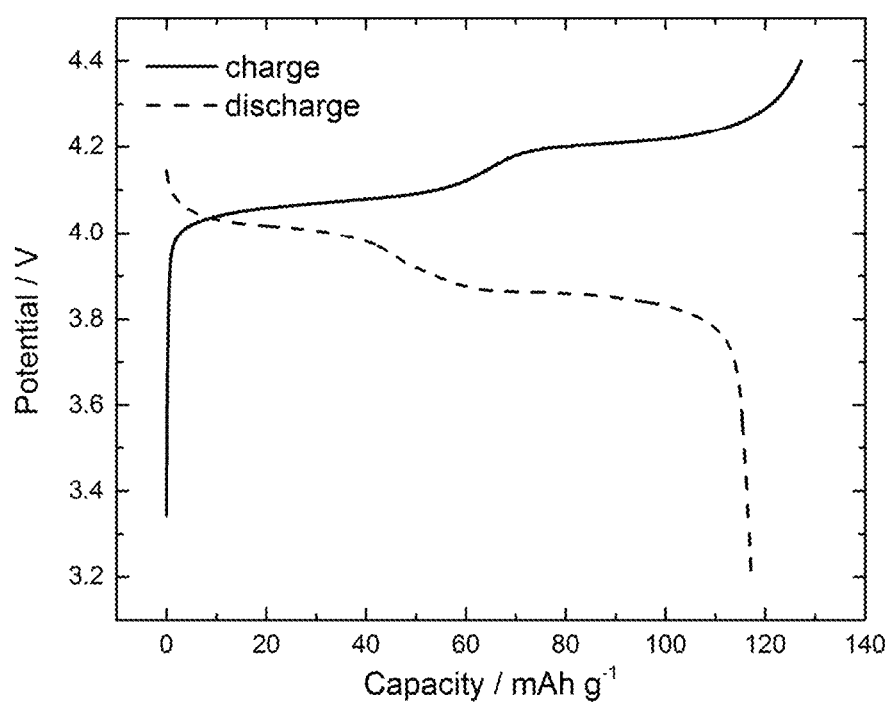
FIG. 2A illustrates voltage profile of modified coin cell with hole.
Figure 2B:
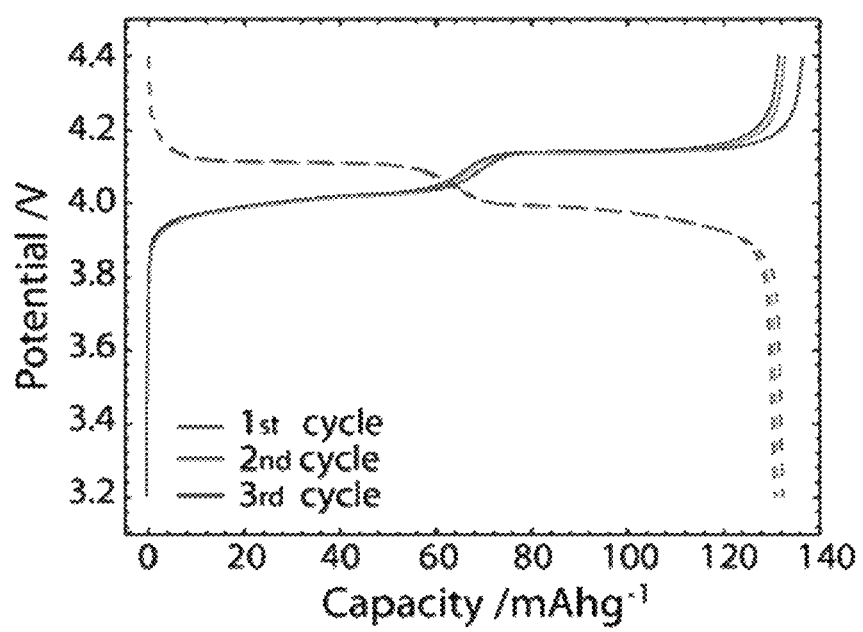
FIG. 2B shows a voltage profile of a typical closed cell, according to the examples.
Figure 3A:
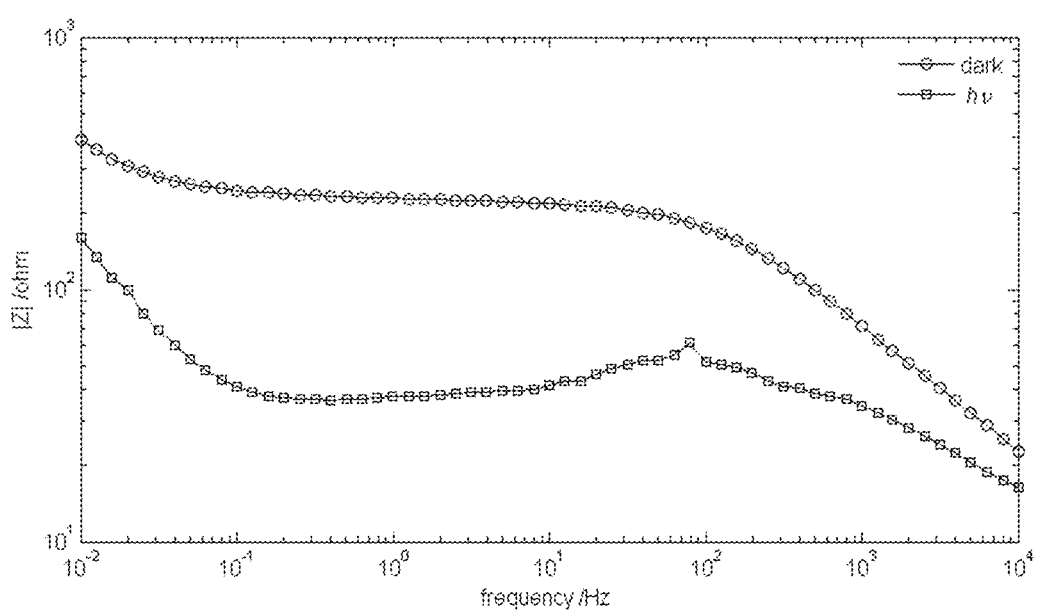
Figure 3B:
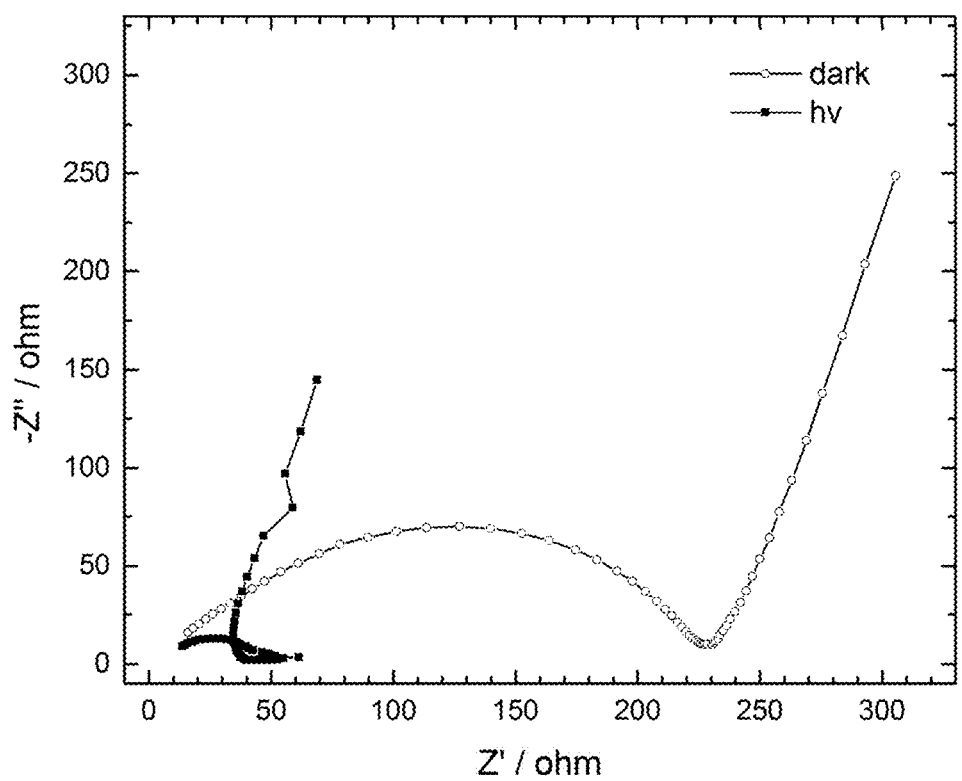

To show electrochemical viability, the open cell battery was cycled in the "dark" state, as demonstrated and shown in FIG. 2A. The cell was cycled at a current density of 0.5 mA, between 3.2 V and 4.4 V at rates ranging from 2 C to C/10 (calculated based upon a theoretical capacity of 148 mAhg$^{-1}$ for $LiMn_2O_4$). Yielding a reversible specific capacity of 130 mAhg$^{-1}$ demonstrates the expected operation of the cell, and the near complete utilization of the cathode (88% of theoretical). The voltage profiles are also ideal, and nearly match the marked voltage profiles of FIG. 2B, which is the response of a Li/$LiMn_2O_4$ closed coin cell with conventional laminate. The electrochemical impedance Nyquist and Bode plots taken at cell voltage 3.59 V with a 5 mV AC signal amplitude between 10,000 Hz to 0.01 Hz is given in FIGS. 3A and B. The impedance of the cathode material in the light state is significantly lower than the 'dark' state. This indicates a lowering of all uphill barriers such as the electrode interfacial impedance, the charge transfer resistance and the bulk Li cation diffusion. The inductive loop indicated in the filled square curve is presumably due to non-equilibrium conditions in the cell during 'light-on' state. Nonetheless, indications are that the lower overall impedance should bode well for better (faster) charging.

Figure 4:
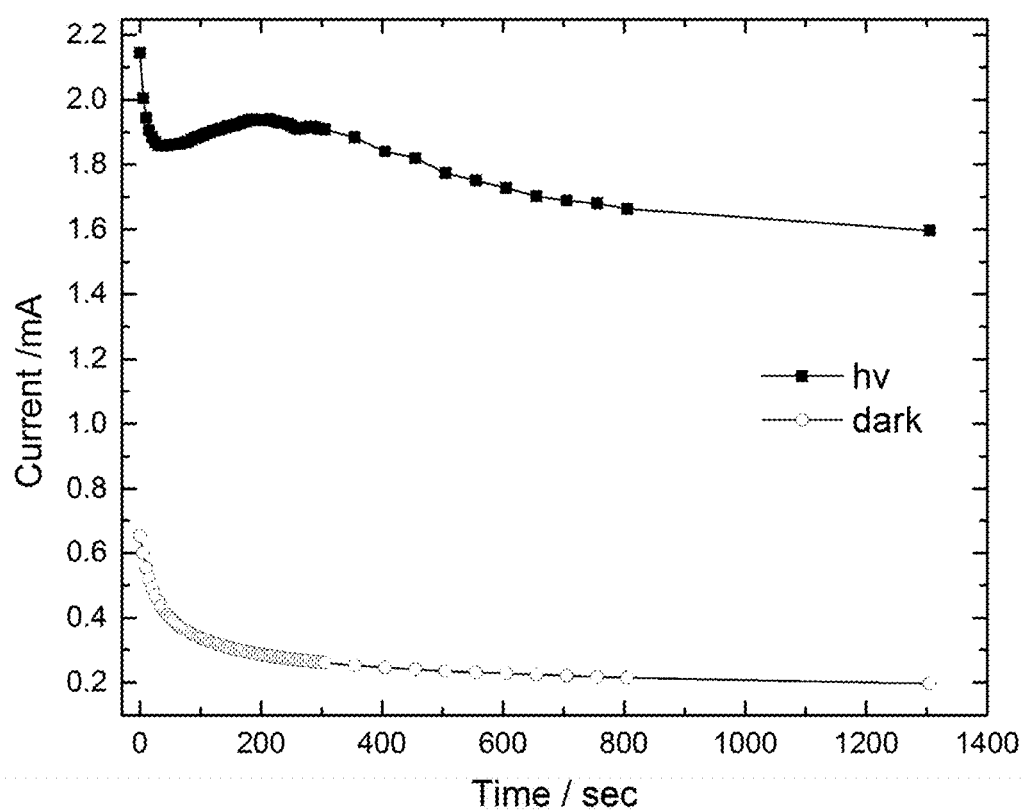
FIG. 4 illustrates chronoamperometry measurements with the current response being measured by applying a constant voltage of 4.07 V for 30 min, and where the integrated area under the curve for 'dark' experiment is 0.32 C and for 'light' is 2.28 C, and the dark state is indicated by open circles and light on state is indicated by filled squares).

FIG. 4 encompasses an experiment whereby a constant voltage of 4 V is delivered to the cell, and the current is measured. Certainly the expectation of an exponential decay of current (i) in time should occur and indeed is observed. In contrast, the light irradiated cell shows a completely different current i vs. time trace. First, the magnitude of current produced at the outset is about times higher than the 'dark' state, and then after a slight downward, then upward peak like behavior, the current continues to be maintained for the duration of the 30 minute experiment.

Figure 5:
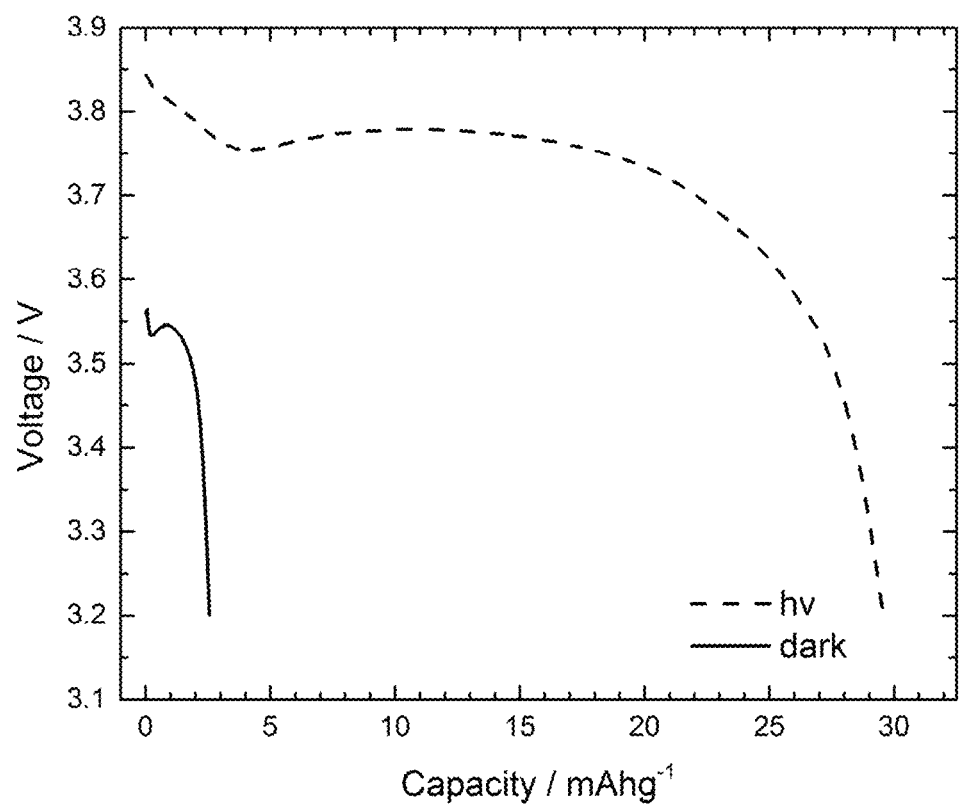
FIG. 5 shows the discharge voltage profile, where after the 'light' experiment, a higher energy density was sustained (indicated in red) as compared to the 'dark' state condition shown in blue curve. The specific capacity is 29 mAh/g (post-light) versus 3 mAh/g (no light), an increase of over a magnitude in stored charge. A value of 0.5 mA constant current was applied for the measurements. (Dark is indicated by a solid line, light is indicated in a dash line).

FIG. 5 shows the voltages profiles for the follow-up discharge in the 'dark' state. The sustained voltage at approximately 3.8 V (dash line curve) indicates a higher energy density versus the 'dark' state condition (solid line curve; no capacity/low voltage). Specific capacity is 17 mAh/g (light) versus 3 mAh/g, an increase of over a magnitude of stored charge.

Figure 6A:
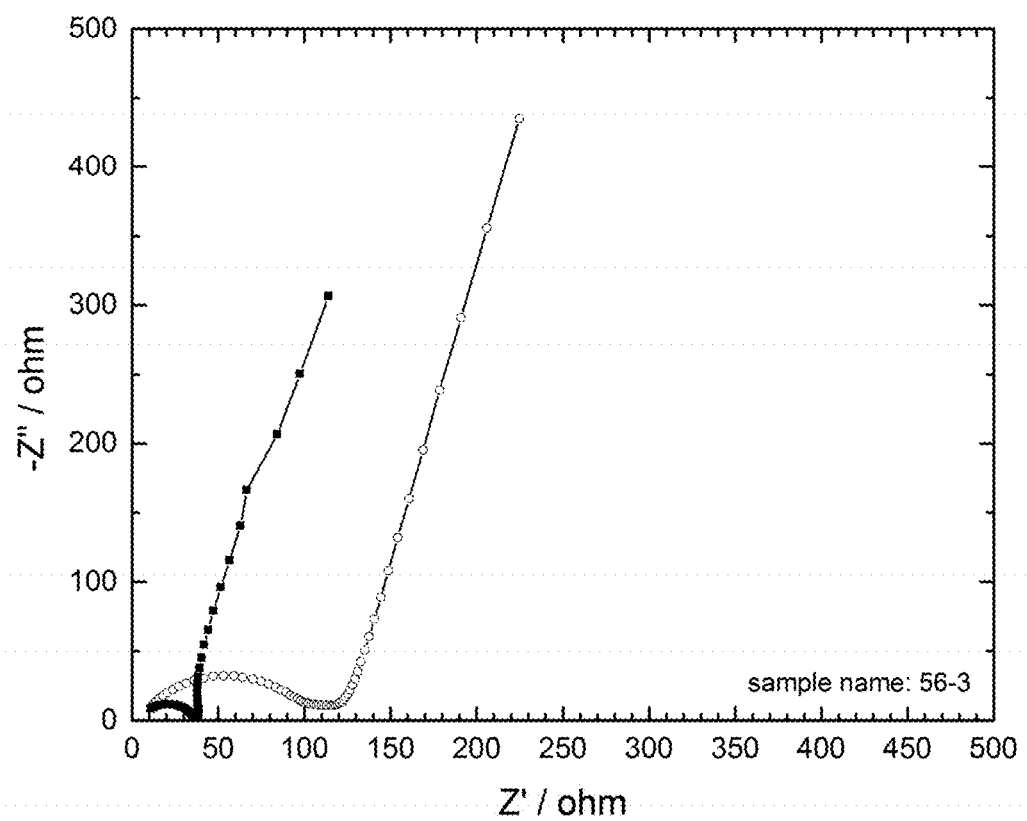
FIGS. 6A, 6B, and 6C are (A) AC impedance spectra with light on versus dark state in coin cell (Voc=3.5 V) as above in FIG. 1. (B) Chronoamperometry curves for light-on versus dark state during constant voltage hold charging at 4.07 V (vs. Li metal counter electrode) for approximately 23 minutes. (For both (A) and (B), the dark state is indicated by open circles and light on state is indicated by filled squares) (C) Unlighted constant discharge curves (voltage profiles)
Figure 6B:
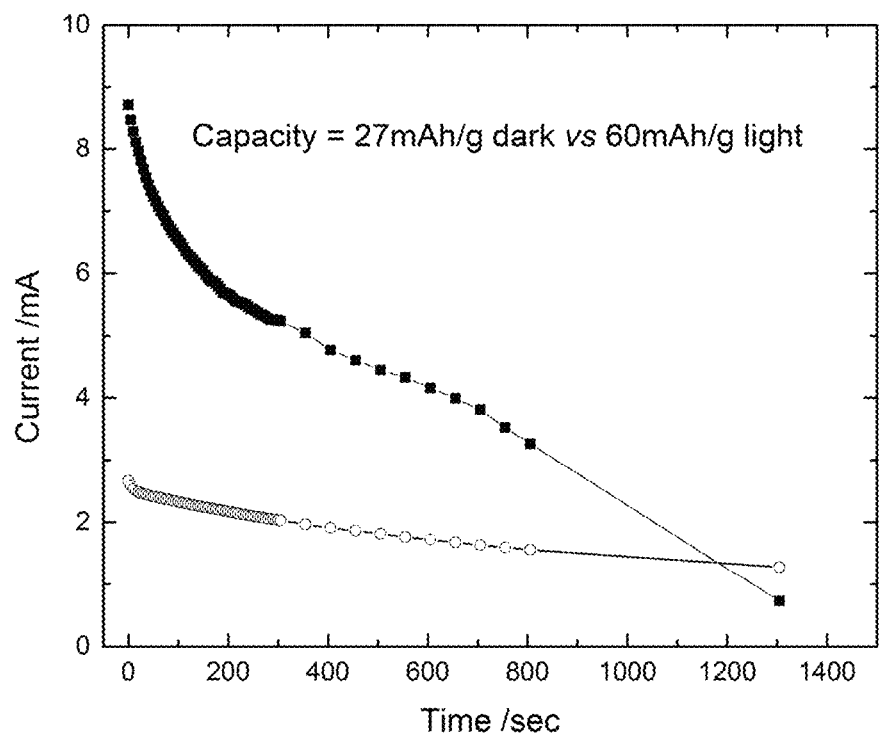
Figure 6C:
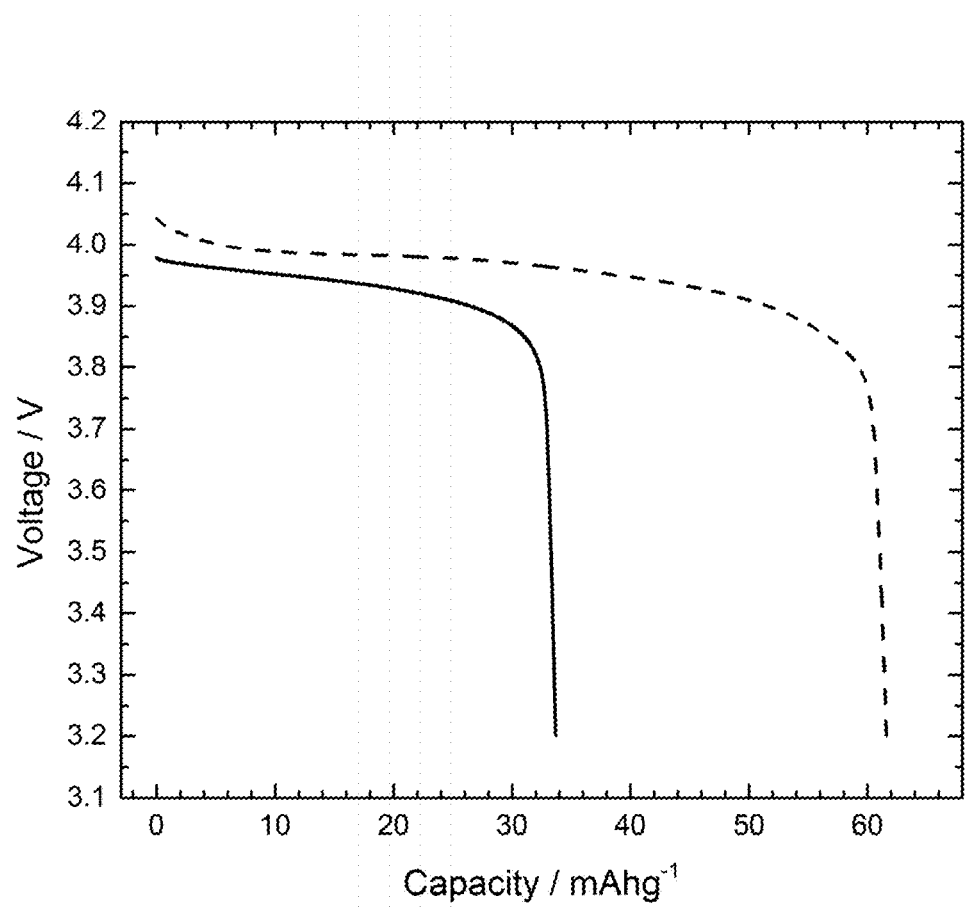

Example 2. Similar to Example 1, another cell was prepared. During testing, after a one charge-discharge 'dark' cycle, the electrochemical impedance Nyquist plots were taken at 3.59 V open circuit potential with a 5 mV AC signal amplitude between 10 kHz to 0.01 Hz as shown in FIGS. 6A, 6B, and 6C. The impedance of the cathode material in the light state is significantly lower than the 'dark' state. This indicates a lowering of all uphill barriers such as the electrode interfacial impedance, the charge transfer resistance and the bulk Li cation diffusion. All of these processes are kinetically improved. A second set of control AC impedance experiments were conducted under dark state with the cell impedance analyzed at 37° C. and 50° C. Very little difference in the impedance spectra was observed thus providing additional evidence that heat does not have a large effect on the material response in this configuration.

FIG. 6B encompasses a DC experiment whereby a constant voltage of 4.07 V is delivered to the cell, and the current is measured. Beginning about 2.7 mA and falling off to about 1.2 mA after about 23 minutes is the trace output. The amount of capacity gleaned from the material through integrating the charge in time is 2.29 C, or 27 mAh/g (based on the oxide active weight; chemical state is $LiMn_2O_4$). Even after ~23 minutes the current is still relatively high and the reaction continues. From the galvanostatic result in FIG. 6B, the amount of capacity expected at 4.07 V should be approximately 60 mAh/g (C); clearly the 'dark' state cell does not reach 60 mAh/g. In contrast, the light irradiated cell shows a completely different current i vs. time trace. First, the magnitude of current produced at the outset is about 4 times higher than the 'dark' state, and then after an exponential decrease downward, followed by a slight S-shape, next a linear region occurs at 600 seconds (10 minutes) proceeding to near zero current after about 23 minutes (1400 seconds).

FIG. 6C shows the voltage profiles for the follow-up constant current unlighted discharge. The sustained voltage at approximately 4.0 V indicates a reversible electrochemical reaction and one that is higher energy density for light-on versus the 'dark' state condition. Specific capacity or charge stored per weight is 60 mAh/g (light-on) versus 27 mAh/g (dark state), or an increase of about twice the stored charge. Moreover, the coulombic efficiency for both are near 100% indicating a fully reversible electrochemical reaction.

The "dark" state electrode impedance spectrum is the circle curve, while the light-on impedance spectrum is in square. The impedance of the cathode material in the light state is significantly lower than the dark state. This indicates a lowering of all uphill barriers such as the electrode interfacial impedance, the charge transfer resistance and the bulk Li cation diffusion. All of these processes are kinetically improved. The inductive loop in the red curve is presumably due to non-equilibrium conditions in the cell during "light-on" state. Nonetheless, indications are that the lower overall impedance should bode well for better (faster) charging.

Electron paramagnetic resonance (EPR) conducted at 10 Kelvin (to slow back electron transfer) in a light state versus a control dark state indicates a photo-oxidation process occurs generating a higher population of $Mn^{4+}$ holes at the surface that drives the chemical-electrochemical coupled reactions. See FIGS. 7 and 8.

FIGS. 7A and 7B show the low temperature continuous wave (CW) X-band EPR spectra of the charged LiMn204 battery (4.07 V) during illumination (FIG. 7A). Note that the CW EPR method results in a derivative-type lineshape. Before illumination, in the center of the spectrum at 340 mT (corresponding to g equal to about 2) a narrow and intense signal is observed which we attribute to defects in the carbon and binder part of the composite cathode. The six line signal with approximately 50 mT total width is typical for $Mn^{2+}$ ions. Since $Mn^{2+}$, even in small concentration, gives intense signals, the actual amount of $Mn^{4+}$ in the battery material may be relatively small. A broad signal with several hundreds of mT, centered at g≈2 is observed, which is typical for paramagnetic $M^{4+}$ ions interacting with many close-by paramagnetic ions like other $M^{4+}$ ions or $Mn^{3+}$ in $LiMn_2O_4$ spinels. Trivalent $Mn^{3+}$ ions themselves are not directly observable under the experimental conditions. Upon illumination, a new additional broad signal with a width of approximately 215 mT, less width than the broad 'dark' $Mn^{4+}$ signal, is generated. This type of signal is typical for $Mn^{4+}$ in $LiMn_2O_4$ spinel, but has different coordination and/or magnetic surrounding than the 'dark' $Mn^{4+}$ signal.

FIG. 7B shows that this signal is created rapidly after illumination starts, reaches a plateau, and decays almost quantitatively, after illumination is ceased. The generation of $Mn^{4+}$ ions is in agreement with the photochemically induced disproportionation reaction outlined in eq. 1. Control samples with the carbon, binder and electrolyte, neat $LiMn_2O_4$, the $LiMn_2O_4$ being combined with electrolyte but without carbon binder were also measured. The carbon/binder with electrolyte gave only a radical signal (g of about 2.0035, $1w_{pp}$=0.5 mT) before and during the illumination. Both neat $LiMn_2O_4$ and $LiMn_2O_4$ with electrolyte gave also broad $Mn^{4+}$ signals before illumination,hd and showed light-induced kinetics of $Mn^{4+}$ creation and decay after illumination ceased. Interestingly, the $LiMn_2O_4$ with electrolyte showed slower rise and decay times. It is believed that may be attributed to the absence of the carbon and binder which can act as an electron shuttle/buffer. In summary, FIGS. 7A and 7B are representative of the fact that more $Mn^{4+}$ signal is produced with light on, meaning the reaction with light is occurring and the material is responding to light, by being oxidized (or light-charged).

Example 3. Similar to Examples 1 and 2, a further cell was prepared. Electrochemical performance of the cell (Li | |1.2 M $LiPF_6$; EC:EMC 3:7 (w:w) | |LMO; (EC=ethylene carbonate; EMC=ethyl methyl carbonate; LMO is $LiMn_2O_4$) was tested and is presented in FIGS. 9A and B. In FIG. 9A, the charge (chronoamperometry at 4.07 V vs. $Li^{+/o}$ for 5 minutes), and, in FIG. 9B, the discharge (galvanostatic discharge at C/10) were observed. The charge/discharge capacities in the 'light off' state yielded 30.14/29.92 mAh $g^{-1}$ and 29.55/29.28 mAh $g^{-1}$ before and after the 'light on' experiment, respectively. In the 'light on' state the charge/discharge capacities were 41.60/40.87 mAh $g^{-1}$, representing a capacity increase of 1.38 times or an increase in the charging rate by a factor of 1.7 compared to the 'light-off' state.

Example 4. The electrochemical performance of a light accepting 'open' lithium ion battery cell during charge (chronoamperometry at 4.07 V vs. $Li^{+/o}$ for 5 minutes) with respect to temperature is illustrated by FIG. 10. Li | |1.2 M $LiPF_6$; EC:EMC 3:7 (w:w) | |LMO (EC=ethylene carbonate; EMC=ethyl methyl carbonate). The temperature was controlled to within ±0.2° C. using a Maccor heat/cool temperature chamber (MTC-010) and the cell was allowed to equilibrate at each temperature for 2 h before testing. The charge and discharge capacities, along with the cycling efficiency and capacity increase compared to the 25° C. experiment, are shown in the table inset. In the elevated temperature experiments the capacity increase ranged from 1.06-1.26, and the charging rate increased by a factor of 1.09-1.45, compared to the 25° C. experiment.

Para. A. In one aspect, an electrochemical cell comprising a cathode, an anode, a non-aqueous electrolyte, and a cathode illumination source configured to direct a light source at the cathode during a charging cycle.

Para. B. The electrochemical cell of Para. A, wherein the light source is a broadband white light source or a monochromatic light source.

Para. C. The electrochemical cell of Para. A or B, wherein the light source is a light emitting diode, a xenon lamp, a laser, or optical fiber.

Para. D. The electrochemical cell of any one of Paras. A-C, wherein the illumination source is a window in a housing for the electrochemical cell.

Para. E. The electrochemical cell of any one of Paras. A-D, wherein the illumination source is a fiber optic.

Para. F. The electrochemical cell of any one of Paras. A-E, wherein the illumination source and the light source are both a light emitting diode.

Para. G. The electrochemical cell of any one of Paras. A-F, wherein the illumination source further comprises an infrared filter.

Para. H. The electrochemical cell of any one of Paras. A-G wherein the electrochemical cell is a lithium ion battery.

Para. I. The electrochemical cell of any one of Paras. A-H, wherein the cathode comprises a cathode active material comprising a spinel, a olivine, a carbon-coated olivine, $LiFePO_4$, $LiCoO_2$, $LiNiO_2$, $LiNi_{1-x}Co_yM^4_zO_2$, $LiMn_{0.5}Ni_{0.5}O_2$, $LiMn_{1/3}Co_{1/3}Ni_{1/3}O_2$, $LiMn_2O_4$, $LiFeO_2$, $LiM^4_{0.5}Mn_{1.5}O_4$, $Li_{1+x''}Ni_\alpha Mn_\beta Co_\gamma M^5_\delta O_{2-z''}F_{z'''}$, $A_nB^1_2(M^5O_4)_3$, or $VO_2$; wherein: $M^4$ is Al, Mg, Ti, B, Ga, Si, Mn, or Co; $M^5$ is Mg, Zn, Al, Ga, B, Zr, or Ti; A is Li, Ag, Cu, Na, Mn, Fe, Co, Ni, Cu, or Zn; $B^1$ is Ti, V, Cr, Fe, or Zr; $0 \leq x \leq 0.3$; $0 \leq y \leq 0.5$; $0 \leq z \leq 0.5$; $0 \leq m \leq 0.5$; $0 \leq n \leq 0.5$; $0 \leq x'' \leq 0.4$; $0 \leq \alpha \leq 1$; $0 \leq \beta \leq 1$; $0 \leq \gamma \leq 1$; $0 \leq \delta' \leq 0.4$; $0 \leq z'' \leq 0.4$; and $0 \leq n' \leq 3$; with the proviso that at least one of $\alpha$, $\beta$ and $\gamma$ is greater than 0.

Para. J. The electrochemical cell of Para. I, wherein the cathode comprises a cathode active material comprising $LiFePO_4$, $LiCoO_2$, $LiNiO_2$, $LiNi_{1-x}Co_yM^4_zO_2$, $LiMn_{0.5}Ni_{0.5}O_2$, $LiMn_{1/3}Co_{1/3}Ni_{1/3}O_2$, $LiMn_2O_4$, $LiCr_{0.5}Mn_{1.5}O_4$, $LiCrMnO_4$, $LiFe_{0.5}Mn_{1.5}O_4$, $LiCo_{0.5}Mn_{1.5}O_4$, $LiCoMnO_4$, $LiCoMnO_4$, $LiNi_{0.5}Mn_{1.5}O_4$, $LiNiPO_4$, $LiCoPO_4$, $LiMnPO_4$, $LiCoPO_4F$, $Li_2MnO_3$, $Li_5FeO_4$, or $Li_{x'}(Met)O_2$; wherein: Met is a transition metal and $1 > x' \leq 2$.

Para. K. The electrochemical cell of Para. J, wherein Met is Ni, Co, Mn, or a mixture of any two or more thereof.

Para. L. The electrochemical cell of Para. I, wherein the cathode comprises a cathode active material comprising manganese.

Para. M. The electrochemical cell of Para. I, wherein the cathode active material comprises $LiMn_{0.5}Ni_{0.5}O_2$, $LiMn_{1/3}Co_{1/3}Ni_{1/3}O_2$, $LiMn_2O_4$, $LiM^4_{0.5}Mn_{1.5}O_4$, $Li_{1+x''}Ni_\alpha Mn_\beta Co_\gamma M^5_{67}O_{2-z''}F_{z'''}$, $LiMn_{0.5}Ni_{0.5}O_2$, $LiMn_{1/3}Co_{1/3}Ni_{1/3}O_2$, $LiMn_2O_4$, $LiCr_{0.5}Mn_{1.5}O_4$, $LiCrMnO_4$, $LiFe_{0.5}Mn_{1.5}O_4$, $LiCo_{0.5}Mn_{1.5}O_4$, $LiCoMnO_4$, $LiCoMnO_4$, $LiNi_{0.5}Mn_{1.5}O_4$, $LiMnPO_4$, or $Li_2MnO_3$; wherein: $M^4$ is Al, Mg, Ti, B, Ga, Si, Mn, or Co; $M^5$ is Mg, Zn, Al, Ga, B, Zr, or Ti; A is Li, Ag, Cu, Na, Mn, Fe, Co, Ni, Cu, or Zn; $B^1$ is Ti, V, Cr, Fe, or Zr; and $0 \leq x \leq 0.3$; $0 \leq y \leq 0.5$; $0 \leq z \leq 0.5$; $0 \leq m \leq 0.5$; $0 \leq n \leq 0.5$; $0 \leq x'' \leq 0.4$; $0 \leq \alpha \leq 1$; $0 < \beta \leq 1$; $0 \leq \gamma \leq 1$; $0 \leq \delta' \leq 0.4$; $0 \leq z'' \leq 0.4$; and $0 \leq n' \leq 3$.

Para. N. The electrochemical cell of any one of Paras. A-M further comprising a separator disposed between the cathode and the anode.

Para. O The electrochemical cell of any one of Paras. A-N, wherein the non-aqueous electrolyte comprises a solvent and a salt.

Para. P. A process for charging a discharged electrochemical cell, the process comprising: applying a voltage bias to the discharged electrochemical cell; and illuminating the cathode with a light source; wherein: the discharged electrochemical cell comprises a cathode, an anode, a non-aqueous electrolyte, and an illumination source.

Para. Q. The process of Para. P, wherein the light source is a broadband white light source.

Para. R. The process of Para. P or Q, wherein the light source is a light emitting diode, a xenon lamp, a laser, or optical fiber.

Para. S. The process of any one of Paras. P-R, wherein the illumination source is a window in a housing for the electrochemical cell.

Para. T. The process of any one of Paras. P-S, wherein the illumination source is a fiber optic.

Para. U. The process of any one of Paras. P-T, wherein the illumination source further comprises an infrared filter.

Para. V. The process of any one of Paras. P-U, wherein the electrochemical cell is a lithium ion battery, a sodium ion battery, a magnesium ion battery, or a sulfur battery.

Para. W. A method of generating $Mn^{4+}$ in an electrode of an electrochemical cell, the method comprising applying a charging current to the electrochemical cell, and simultaneously illuminating the electrode with visible light.

Para. X. The method of Para. W, wherein the visible light is broadband white or a monochromatic light.

Para. Y. The method of Para. W or X, wherein the electrochemical cell is a lithium ion battery, a sodium ion battery, a magnesium ion battery, or a sulfur battery.

Para. Z. The method of any oen of Paras. W-Y, wherein the electrode is a cathode.

While certain embodiments have been illustrated and described, it should be understood that changes and modifications can be made therein in accordance with ordinary skill in the art without departing from the technology in its broader aspects as defined in the following claims.

The embodiments, illustratively described herein may suitably be practiced in the absence of any element or elements, limitation or limitations, not specifically disclosed herein. Thus, for example, the terms "comprising," "including," "containing," etc. shall be read expansively and without limitation. Additionally, the terms and expressions employed herein have been used as terms of description and not of limitation, and there is no intention in the use of such terms and expressions of excluding any equivalents of the features shown and described or portions thereof, but it is recognized that various modifications are possible within the scope of the claimed technology. Additionally, the phrase "consisting essentially of" will be understood to include those elements specifically recited and those additional elements that do not materially affect the basic and novel characteristics of the claimed technology. The phrase "consisting of" excludes any element not specified.

The present disclosure is not to be limited in terms of the particular embodiments described in this application. Many modifications and variations can be made without departing from its spirit and scope, as will be apparent to those skilled in the art. Functionally equivalent methods and compositions within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds compositions or biological systems, which can of course vary. It is also to be understood that the terminology used herein is for the purpose of describing particular embodiments only, and is not intended to be limiting.

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, particularly in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," and the like, include the number recited and refer to ranges which can be subsequently broken down into subranges as discussed above. Finally, as will be understood by one skilled in the art, a range includes each individual member.

All publications, patent applications, issued patents, and other documents referred to in this specification are herein incorporated by reference as if each individual publication, patent application, issued patent, or other document was specifically and individually indicated to be incorporated by reference in its entirety. Definitions that are contained in text incorporated by reference are excluded to the extent that they contradict definitions in this disclosure.

Other embodiments are set forth in the following claims.

What is claimed is:

1. A process for charging a discharged electrochemical cell, the process comprising:
    applying a voltage bias to the discharged electrochemical cell; and
    illuminating the cathode with a light source;
    wherein:
        under illumination with the light source the discharged electrochemical cell is charged to a predetermined state in less time than the same discharged electrochemical cell in the absence of illumination;
        the discharged electrochemical cell comprises a cathode, an anode, and a non-aqueous electrolyte; and
        the electrochemical cell is a lithium ion battery, a sodium ion battery, a magnesium ion battery, or a sulfur battery.

2. The process of claim 1, wherein the light source is a broadband white light source.

3. The process of claim 1, wherein the light source is a light emitting diode, a xenon lamp, a laser, or optical fiber.

4. The process of claim 1, wherein the illumination source further comprises an infrared filter.

5. The process of claim 1, wherein the electrochemical cell is a lithium ion battery.

6. The process of claim 1, wherein the electrochemical cell is a sodium ion battery.

7. The process of claim 1, wherein the electrochemical cell is a magnesium ion battery.

8. The process of claim 1, wherein the electrochemical cell is a sulfur battery.

9. The process of claim 1, wherein the cathode comprises a cathode active material comprising a spinel, a olivine, a carbon-coated olivine, $LiCoO_2$, $LiNiO_2$, $LiNi_{1-x}Co_yM^4_zO_2$, $LiMn_{0.5}Ni_{0.5}O_2$, $LiMn_{1/3}Co_{1/3}Ni_{1/3}O_2$, $LiMn_2O_4$, $LiFeO_2$, $LiM^4_{0.5}Mn_{1.5}O_4$, $Li_{1+x''}Ni_\alpha Mn_\beta Co_\gamma M^5_{67'}O_{2-z''}F_{z'''}$, or $VO_2$;
    wherein:
        $M^4$ is Al, Mg, Ti, B, Ga, Si, Mn, or Co;
        $M^5$ is Mg, Zn, Al, Ga, B, Zr, or Ti;
        $0 \leq x \leq 0.3$; $0 \leq y \leq 0.5$; $0 \leq z \leq 0.5$; $0 \leq m \leq 0.5$; $0 \leq n \leq 0.5$; $0 \leq x'' \leq 0.4$; $0 \leq \alpha \leq 1$; $0 \leq \beta \leq 1$; $0 \leq \gamma < 1$; $0 \leq \delta' \leq 0.4$; and $0 \leq z'' \leq 0.4$;
        with the proviso that at least one of $\alpha$, $\beta$ and $\gamma$ is greater than 0.

10. The process of claim 1, wherein the cathode comprises a cathode active material comprising $LiFePO_4$, $LiCoO_2$, $LiNiO_2$, $LiMn_{0.5}Ni_{0.5}O_2$, $LiMn_{1/3}Co_{1/3}Ni_{1/3}P_2$, $LiMn_2O_4$, $LiCr_{0.5}Mn_{1.5}O_4$, $LiCrMnO_4$, $LiFe_{0.5}Mn_{1.5}O_4$, $LiCoMnO_4$, $LiNi_{0.5}Mn_{1.5}O_4$, $LiNiPO_4$, $LiCoPO_4$, $LiMnPO_4$, $LiCoPO_4F$, $Li_2MnO_3$, $Li_5FeO_4$, or $Li_{x'}(Met)O_2$;
    wherein:
        Met is a transition metal and $1 < x' \leq 2$.

11. The process of claim 10, wherein Met is Ni, Co, Mn, or a mixture of any two or more thereof.

12. The process of claim 1, wherein the cathode comprises a cathode active material comprising manganese.

13. The process of claim 1, wherein discharged electrochemical cell further comprising a separator between the cathode and the anode.

14. The process of claim 1, wherein the cathode comprises $LiFePO_4$.

15. A process for charging a discharged electrochemical cell, the process comprising:
    applying a voltage bias to the discharged electrochemical cell; and
    illuminating the cathode with a light source;
    wherein:
    the illumination source further comprises an infrared filter;
    the discharged electrochemical cell comprises a cathode, an anode, and a non-aqueous electrolyte; and
    the electrochemical cell is a lithium ion battery, a sodium ion battery, a magnesium ion battery, or a sulfur battery.

* * * * *